(12) United States Patent
Degner

(10) Patent No.: US 10,073,498 B2
(45) Date of Patent: Sep. 11, 2018

(54) ELECTRONIC ACCESSORY DEVICE

(71) Applicant: Apple Inc., Cupertino, CA (US)

(72) Inventor: Brett W. Degner, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/271,177

(22) Filed: Sep. 20, 2016

(65) Prior Publication Data

US 2017/0083048 A1 Mar. 23, 2017

Related U.S. Application Data

(60) Provisional application No. 62/221,576, filed on Sep. 21, 2015.

(51) Int. Cl.
*G06F 3/041* (2006.01)
*G06F 1/16* (2006.01)

(52) U.S. Cl.
CPC ............ *G06F 1/169* (2013.01); *G06F 1/1616* (2013.01); *G06F 1/1632* (2013.01); *G06F 1/1647* (2013.01); *G06F 1/1654* (2013.01); *G06F 3/0416* (2013.01)

(58) Field of Classification Search
CPC ...... G06F 1/169; G06F 1/1616; G06F 1/1632; G06F 1/1647; G06F 1/1654; G06F 3/0416
See application file for complete search history.

(56) References Cited

U.S. PATENT DOCUMENTS

| 5,689,654 | A  | * | 11/1997 | Kikinis | G06F 1/1626 |
|  |  |  |  |  | 345/173 |
| 6,035,214 | A  |  | 3/2000 | Henderson |  |
| 8,725,205 | B2 |  | 5/2014 | Ryan |  |
| 9,642,425 | B2 |  | 5/2017 | Tseng |  |
| 2005/0088463 | A1 |  | 4/2005 | Schilling |  |
| 2008/0273297 | A1 |  | 11/2008 | Kumar |  |
| 2011/0021247 | A1 | * | 1/2011 | Shih | G06F 1/1632 |
|  |  |  |  |  | 455/557 |
| 2012/0309462 | A1 |  | 12/2012 | Micev |  |
| 2012/0315972 | A1 |  | 12/2012 | Olson et al. |  |
| 2013/0080670 | A1 | * | 3/2013 | Medica | G06F 1/1626 |
|  |  |  |  |  | 710/110 |
| 2014/0052884 | A1 |  | 2/2014 | Rogers et al. |  |
| 2014/0240241 | A1 |  | 8/2014 | Moradian |  |

FOREIGN PATENT DOCUMENTS

TW 201507939 A 3/2015

OTHER PUBLICATIONS

International Patent Application No. PCT/US2016/051953—International Search Report and Written Opinion dated Dec. 22, 2016.
Taiwanese Patent Application No. 105130343—Office Action dated Aug. 22, 2017.
Taiwanese Patent Application No. 105130343—Office Action dated Mar. 6, 2018.

* cited by examiner

*Primary Examiner* — Peter D McLoone
(74) *Attorney, Agent, or Firm* — Dickinson Wright RLLP

(57) ABSTRACT

The present application describes various embodiments of systems and methods for providing internal components for portable computing devices having a thin profile. More particularly, the present application describes an electronic accessory device available to extend and expand usefulness of a portable computing device.

20 Claims, 6 Drawing Sheets

ELECTRONIC ACCESSORY DEVICE

CROSS-REFERENCE TO RELATED APPLICATION

This application claims the benefit of U.S. Provisional Patent Application No. 62/221,576, filed on Sep. 21, 2015, which is incorporated by reference herein in its entirety for all purposes.

FIELD

The embodiments described herein relate generally to portable computing devices. More particularly, the present embodiments relate to an accessory device that can extend functionality of a portable computing device.

BACKGROUND

The appearance of a portable computing device, including its design and its heft, is important to a user, as the outward appearance contributes to the overall impression that the user has of the portable computing device. However, due to restrictive amount of available space, the portable computing device can require additional resources to provide extended functionality.

SUMMARY

Embodiments of an accessory that can be used to expand a suite of functions and operational resources available to a portable computing device are disclosed.

In an embodiment, an accessory device can have limited or no data processing resources. The accessory device can have a form factor corresponding to a laptop computer and as such can include data output resources such as a visual display and input resources such as a keyboard. The accessory device can also include memory resources. The accessory device can include a port having a connection mechanism arranged to facilitate a communication channel between the accessory device and a host device. In this way, the host device utilizes resources provided by the accessory device.

An accessory device includes a body having a docking port suitable for accepting a host device and arranged to carry operational components and a communication port that facilitates formation of a communication channel between the host device and at least one of the operational components where the host device provides substantially all processing resources and has full access to the at least one operational component.

A cooperative assembly includes at least a host device having computational resources and a communication port, and an accessory device comprising a communication port and releasably coupled with the host device, the accessory device being incapable of stand-alone intensive computational processing. The host device and the accessory device operate together as a single computational entity, and the host device carries out substantially all intensive computational processing.

A method is carried out by receiving a host device at a accessory device, forming a communication channel between the host device and the accessory device, and controlling an operation of the accessory device by the host device.

Other apparatuses, methods, features and advantages of the disclosure will be or will become apparent to one with skill in the art upon examination of the following figures and detailed description. It is intended that all such additional systems, methods, features and advantages be included within this description, be within the scope of the disclosure, and be protected by the accompanying claims.

BRIEF DESCRIPTION OF THE DRAWINGS

The included drawings are for illustrative purposes and serve only to provide examples of possible structures and arrangements for the disclosed apparatuses, assemblies, methods, and systems. These drawings in no way limit any changes in form and detail that may be made to the disclosure by one skilled in the art without departing from the spirit and scope of the disclosure.

DETAILED DESCRIPTION

Figure 1:
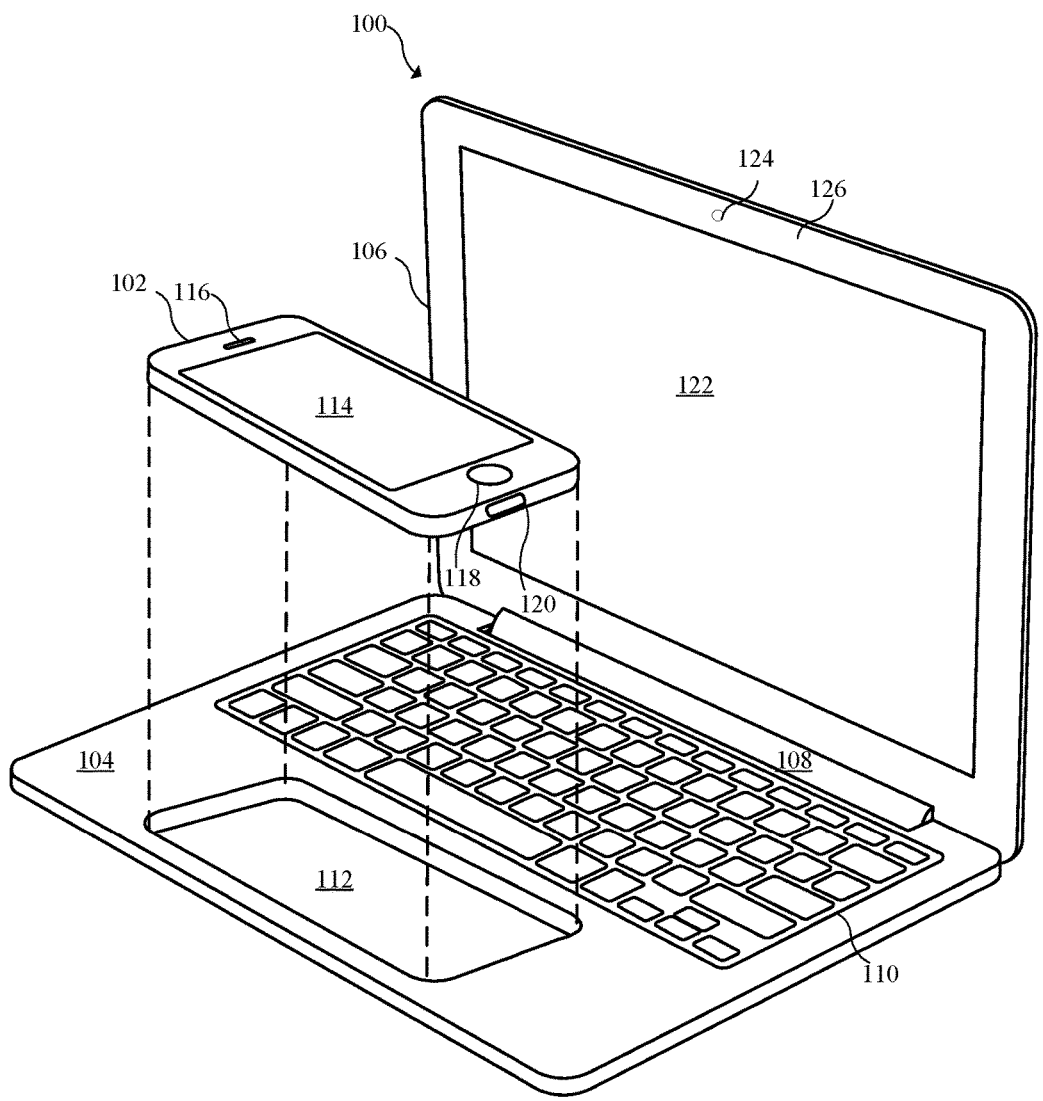
FIG. 1 shows in front facing perspective view an electronic host device decoupled from an electronic accessory device in accordance with the described embodiments.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The following relates to an electronic accessory device that can be used to extend functionality, including input/output resources, of a separate host electronic device, which can be a portable computing device. In various embodiments, the electronic accessory device can be considered a "thin" device, in that it extends the functionality of another device but is inoperable by itself as a stand-alone device. As such, the accessory device can have little or no independent processing resources in the form of a CPU or similar comprehensive processor. The accessory device, however, can provide auxiliary processing resources, such a graphical processing unit, or GPU, or other processing resources that can support the functions of the portable computing device. However, in the context of this discussion, it is anticipated that the accessory device is not a stand-alone computing device but only acts in concert with a host device. The host device can be a portable computing device, such as, for example, a smart phone, media player, tablet computer, or other portable computing device.

In one embodiment, the accessory device can have a form factor of a laptop computer having a display and a keyboard as well as other output/input devices known to be available with a laptop computer. The accessory device, however, does not have the processing resources (such as a CPU) generally associated with a conventional laptop computer. In this regard, the host device can provide the necessary computing resources, but it is the accessory device that provides additional functionality, such as a large display, enhanced audio capabilities, and further input means. These can include, for example, a mouse, track pad, keyboard, and the like.

The accessory device can take many forms. Configured along the lines of a laptop, the accessory device can include a multi-part housing having a top case and a bottom case. The top case can be joined to the bottom case at a reveal to form a laptop accessory device. The laptop accessory device can have top case (i.e. an upper portion or lid) that can house a display screen and other related components, whereas the bottom case (i.e., base portion) can house various processors, drives, ports, battery, keyboard, touchpad and the like.

The base portion can include a port having a size and shape that can accommodate insertion and retention of a host device. In the context of this discussion and without loss of generality, the host device can take the form of a handheld computing device along the lines of a smart phone, media player, or small tablet device. The port can also include a means for communication between the host device and laptop accessory device. This means for communication can include ports and connectors for wired communication and/ or suitable means for wireless communication. The wireless communication protocol can include WiFi, Bluetooth (BT), wireless telephony (LTE, GSM, etc.) or any appropriate radio access technology (RAT). Communication between the host device and the laptop accessory device can include data transfer and power transfer. In one embodiment, the laptop accessory device can include a power supply such as a battery that can be used to power the host device and/or be used to charge up a battery carried by and used to power the host device. In one embodiment, the laptop accessory device can receive external power that can be used to both operate the laptop accessory device and the host device thereby preserving battery resources. In some embodiments the accessory device can be powered by the host device.

In one embodiment, the host device can include a user input device that can receive an input event that can be interpreted by the host device. The host device can then control aspects of either or both the host device and the laptop accessory device. In one embodiment, the user input device can take the form of a touch screen. The touch screen of the host device can receive a user input and control aspects of the laptop accessory device, much like a trackpad of a laptop device. In one embodiment, the user input device can take the form of a microphone used for receiving audible content. In one embodiment, the host device can use audio equipment associated with the accessory device to output audible sound along the lines of music. In one embodiment, the host device can access a memory device carried by the accessory device such that the host device can retrieve and store information therein.

The multipart housing can be formed of a strong and durable yet lightweight material. Such materials can include composite materials and or metals such as aluminum. Aluminum has a number of characteristics that make it a good choice for the multipart housing. For example, aluminum is a good electrical conductor that can provide good electrical ground and it can be easily machined and has well known metallurgical characteristics. The superior conductivity of aluminum provides a good chassis ground for internal electrical components arranged to fit and operate within the housing. The aluminum housing also provides a good electromagnetic interference (EMI) shield protecting sensitive electronic components from external electromagnetic radiation as well as reducing electromagnetic radiation emanating from the portable computing device. In this way, the host device and the accessory device can be isolated from each other in that EMI from either device does not affect the other.

In addition to the keyboard, the accessory device can include a touch sensitive device along the lines of a touch pad, touch screen, etc. In those embodiments where the portable computing device includes a touch pad the touch pad can be formed from a glass material. The glass material provides a cosmetic surface and is the primary source of structural rigidity for the touchpad. The use of the glass material in this way significantly reduces the overall thickness of the touchpad compared to previous designs. The touchpad can include circuitry for processing signals from a sensor associated with the touchpad. In one embodiment, the circuitry can be embodied as a printed circuit board (PCB). The PCB can be formed of material and placed in such a way that provides structural support for the touchpad. Thus, a separate touchpad support is eliminated.

These and other embodiments are discussed below with reference to FIGS. 1-6. However, those skilled in the art will readily appreciate that the detailed description given herein with respect to these figures is for explanatory purposes as the invention extends beyond these limited embodiments. It should be further noted that for the remainder of this discussion, the accessory device would be discussed in terms of an accessory device having a form factor along the lines of a laptop computer. However, more generally speaking, the accessory device can take many forms and be able to use any number of communication mechanisms and protocols for communication.

FIGS. 1-6 show various views of the accessory device in accordance with various embodiments. FIG. 1 shows in front facing perspective view an electronic host device decoupled from an electronic accessory device in accordance with the described embodiments. Accessory device 100 can be an electronic device and can be seen to take on the form factor of a conventional laptop computer. However, accessory device 100 does not generally possess the requisite processing resources (such as those associated with a CPU) and cannot act as a stand-alone unit. In this regard, accessory device 100 can act only as an adjunct to host device 102, such as by enhancing and expanding the functionality of host device 102, which can be an electronic device having its own CPU that can act independently on its own. Accessory device 100 can provide extended functionality and/or additional functionality than would otherwise not be available to host device 102 alone. Accessory device 100 can present various input/output features in an open (lid) state as shown in FIG. 1. Accordingly, accessory device 100 can include base portion 104. Base portion 104 can be pivotally connected to lid portion 106 by way of a clutch assembly hidden from view by cosmetic wall 108. Base portion 104 can be configured to accommodate various user input devices such as keyboard 110. Base portion 104 can also include port 112 having a size and shape in accordance with host device 102. In the described embodiment, host device 102 takes the form of a handheld portable computing device having display 114, output audio port 116, button 118 and interface 120 that facilitates communication with accessory device 100 when captured by port 112.

It should be noted that display 114 can have touch input capabilities by which it is meant that a touch event at display 114 can be interpreted by processing resources carried by host device 102 that can, in turn, be used to control an operation or operations of host device 102 and/or accessory device 100. The touch event can take the form of a gesture. The gesture can include a single finger touch event such as a swipe or a tap. A finger gesture can include touch events from more than one finger applied in unison. The gesture can be sensed by a sensing circuit in display 114 and converted to electrical signals that are passed to a processing unit carried by host device 102 for evaluation. In this way, accessory device 100 can be at least partially controlled by touch. For example, a finger swipe at display 114 can be used to alter a presentation of video content provided by display 122. On the other hand, input provided at display 122 or keyboard 110 can be used to alter an operation of host device 102.

Display 122 can display visual content such as a graphical user interface, still images such as photos as well as video media items such as movies. Display 122 can display images using any appropriate technology such as a liquid crystal display (LCD), OLED, etc. Accessory device 100 can also include image capture device 124 located on a transparent portion of display trim 126. Image capture device 126 can be configured to capture both still and video images.

Figure 2:
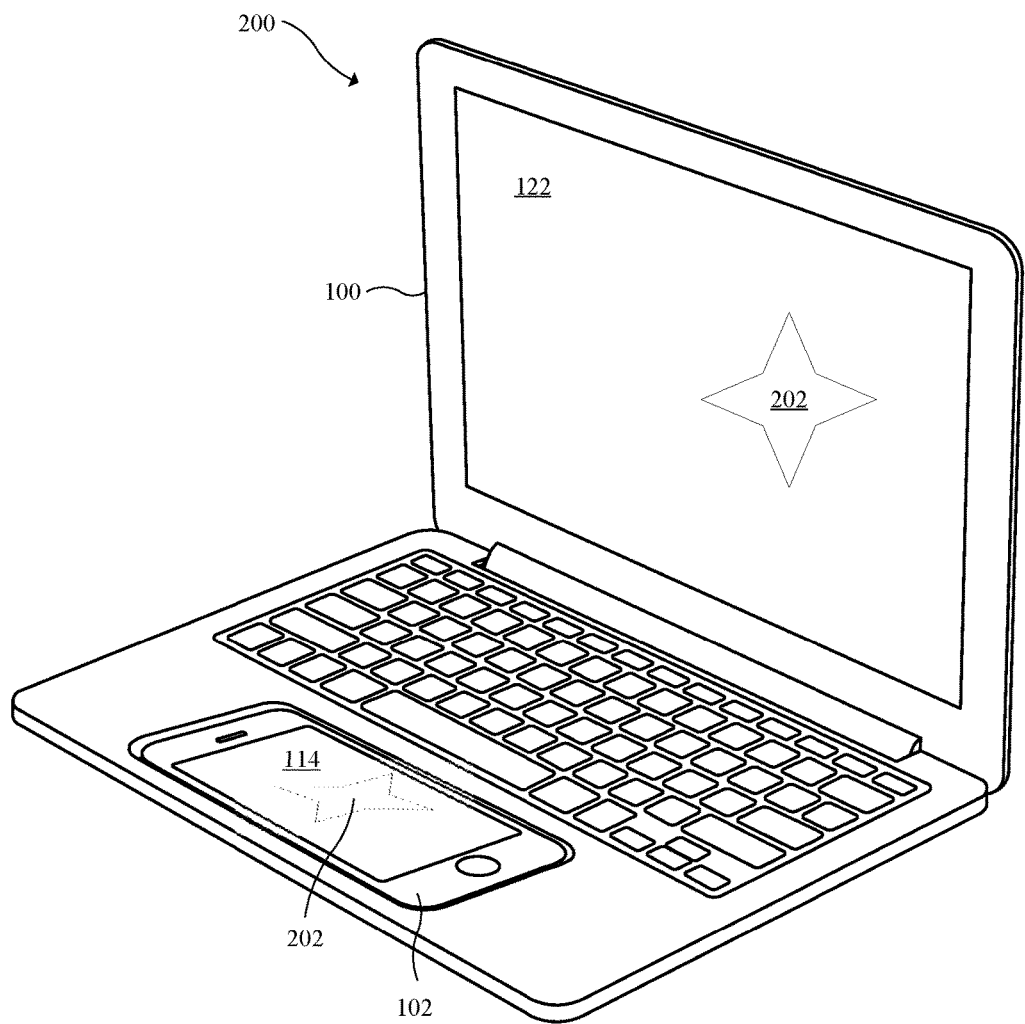
FIG. 2 shows in front facing perspective view the electronic host device and electronic accessory device of FIG. 1 coupled together in accordance with the described embodiments.

FIG. 2 shows in front facing perspective view the electronic host device and electronic accessory device of FIG. 1 coupled together in accordance with the described embodiments. System 200 can be referred to as a cooperating system in that host device 102 and accessory device 100 cooperate with each other and act in unison as a single entity. In other words, a symbiotic relationship between host device 102 and accessory device 100 can be established such that each complements the other and provides functionality and resources not available to either taken separately. For example, icon 202 presented at display 114 can be mirrored on display 122. Moreover, an input event (such as a finger swipe) at icon 202 can be interpreted to control or alter an operation of accessory device 100. For example, if icon 202 represents an audio/video control icon, the visual and/or audio content provided at display 122 or speakers (not shown) can be altered accordingly. Thus, display 114 can be different than display 122 in various embodiments, such as where the display 114 of the host device 102 provides a control or input interface that is configured to control the display 122 of the accessory device 100. Although such a symbiotic relationship between the host device 102 and the accessory device 100 can be established, it should again be emphasized that the host device can operate as a stand-alone device without the accessory device, but the accessory device is inoperable without the host device.

Figure 3:
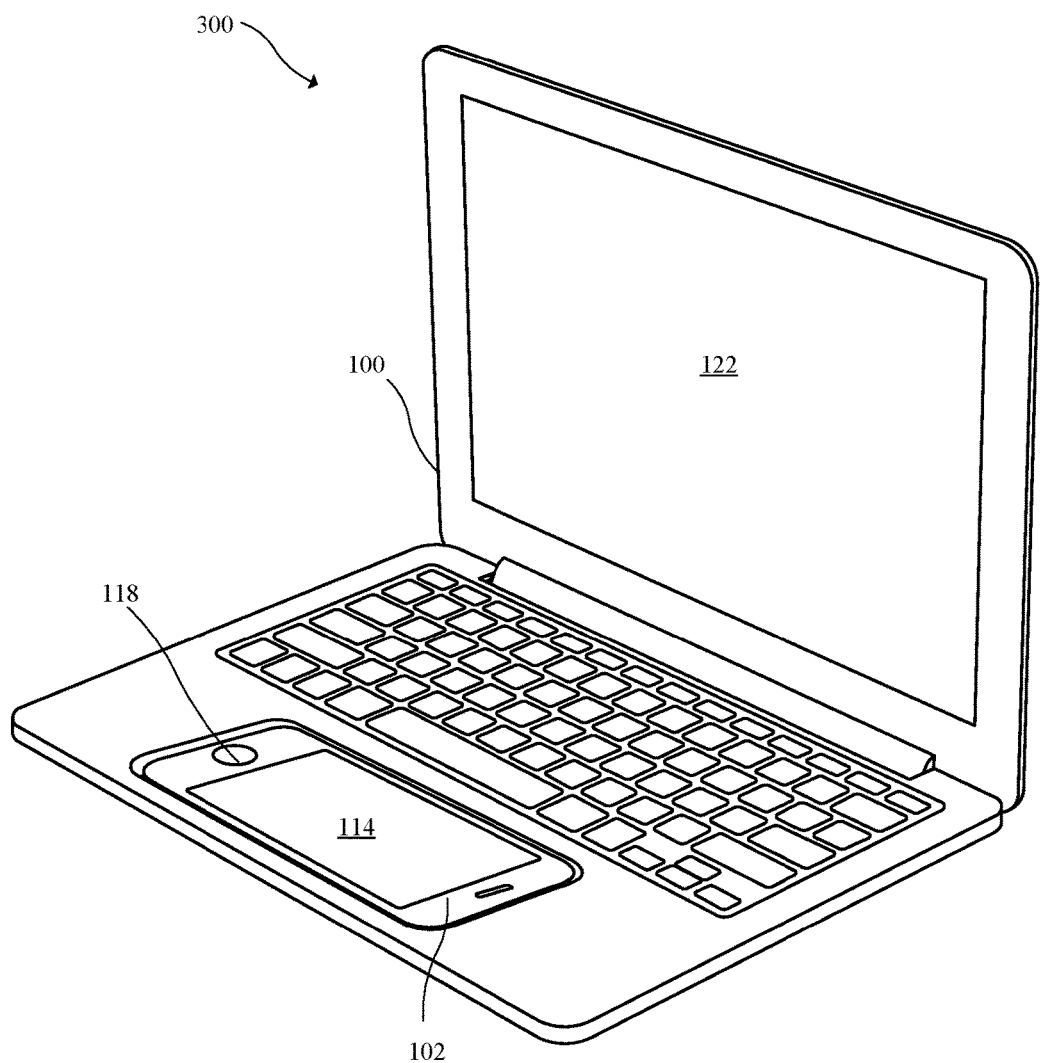
FIG. 3 shows in front facing perspective view the electronic host device and electronic accessory device of FIG. 1 coupled together in an alternative orientation in accordance with the described embodiments.

FIG. 3 shows in front facing perspective view the electronic host device and electronic accessory device of FIG. 1 coupled together in an alternative orientation in accordance with the described embodiments. This other embodiment is provided in the form of host device 102 captured in another orientation. The change in orientation can be used to alter a basic set of operations such as recognition of left vs. right-handed. System 300 can be substantially similar to system 200 above, and may also include a host device 102 having a display 114 and button 118, as well as an accessory device 100 having a display 122. As shown, the host device 102 is oriented at a 180 degree angle within the port of accessory device 100 with respect to the orientation of the host device in system 200 above. This orientation for system 300 can accommodate left-handed users of the system, for example.

Figure 4:
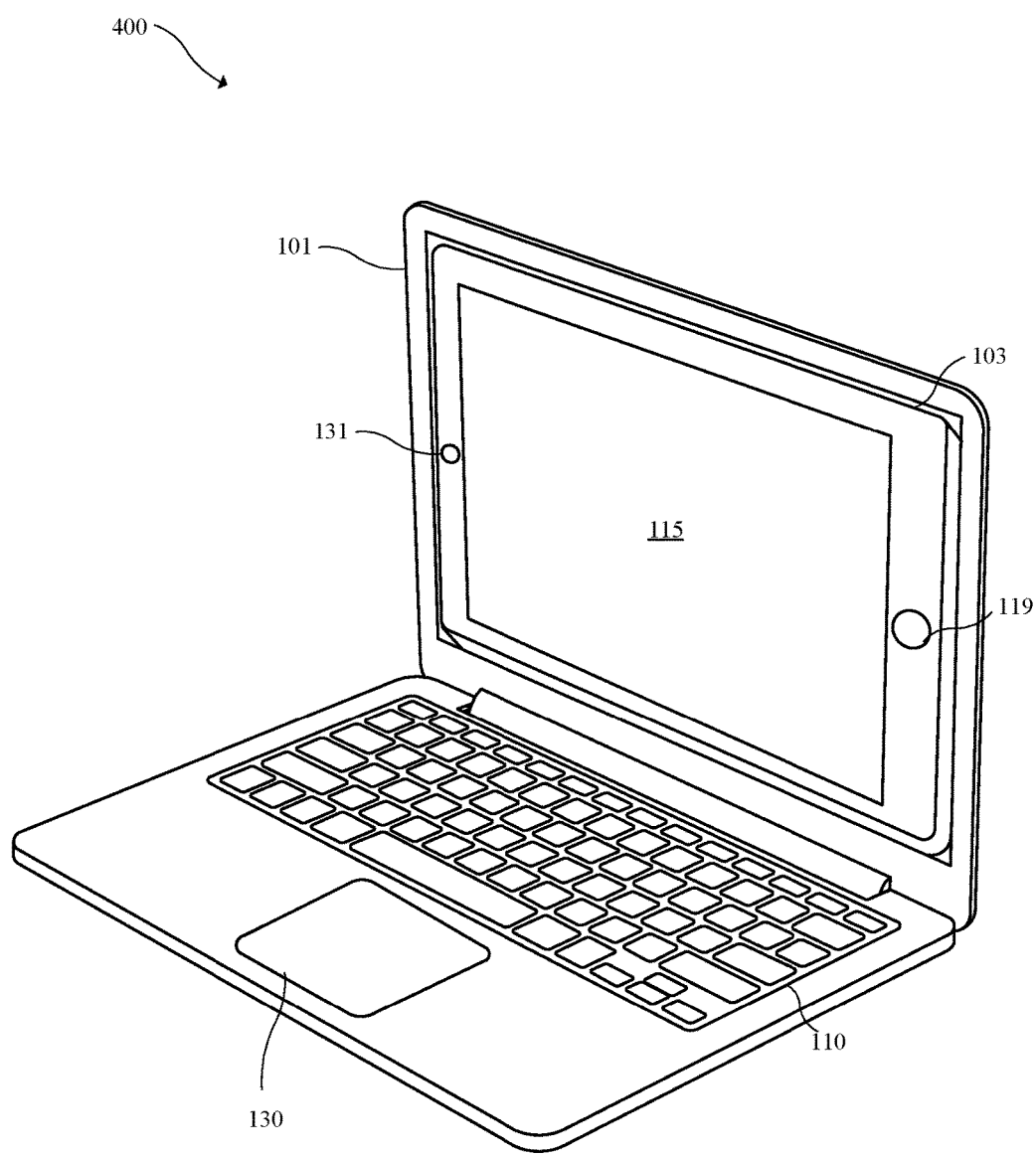
FIG. 4 shows in front facing perspective view an alternative host device coupled together with an alternative accessory device in accordance with the described embodiments.

FIG. 4 shows in front facing perspective view an alternative host device coupled together with an alternative accessory device in accordance with the described embodiments. System 400 can be similar in some regards to system 200 and 300 above. Unlike these forgoing systems, however, system 400 includes an electronic accessory device 101 and an electronic host device 103 that are different than the foregoing accessory devices and host devices. For example, host device 103 can be a tablet computer, which is shown as being positioned within a suitable port of and coupled to the alternative electronic accessory device 101. As will be readily appreciated, host device 103 in the form of a tablet computer can have a relatively large display 115, which may function as a touchscreen. The host device 103 can also have one or more buttons 119, a camera 131, and various other tablet or other alternative computing device features. The alternative accessory device 101 may still be in the form factor of a laptop computer, for example, and may have one or more similar components of the foregoing accessory devices, such as a keyboard 110.

Alternative accessory device 101 may not have its own separate display, however, since the display of host device 103 may be sufficiently large for the overall system 400. Alternative accessory device 101 may also have a touchpad 130 and/or other alternative or additional input or output components, so as to enhance one or more operations or usages of the host device 103 in various embodiments. Again, it is specifically contemplated that the host device 103 is a fully functional electronic device having its own CPU, which may be operable by itself without the accessory device 101. Conversely, it is specifically contemplated that that accessory device 101 is inoperable without the host device 103. That is, the accessory device 101 does not have its own CPU or other comprehensive controlling processor, and cannot operate without the control of a separate host device that is in communication with and configured to control the accessory device.

Figure 5:
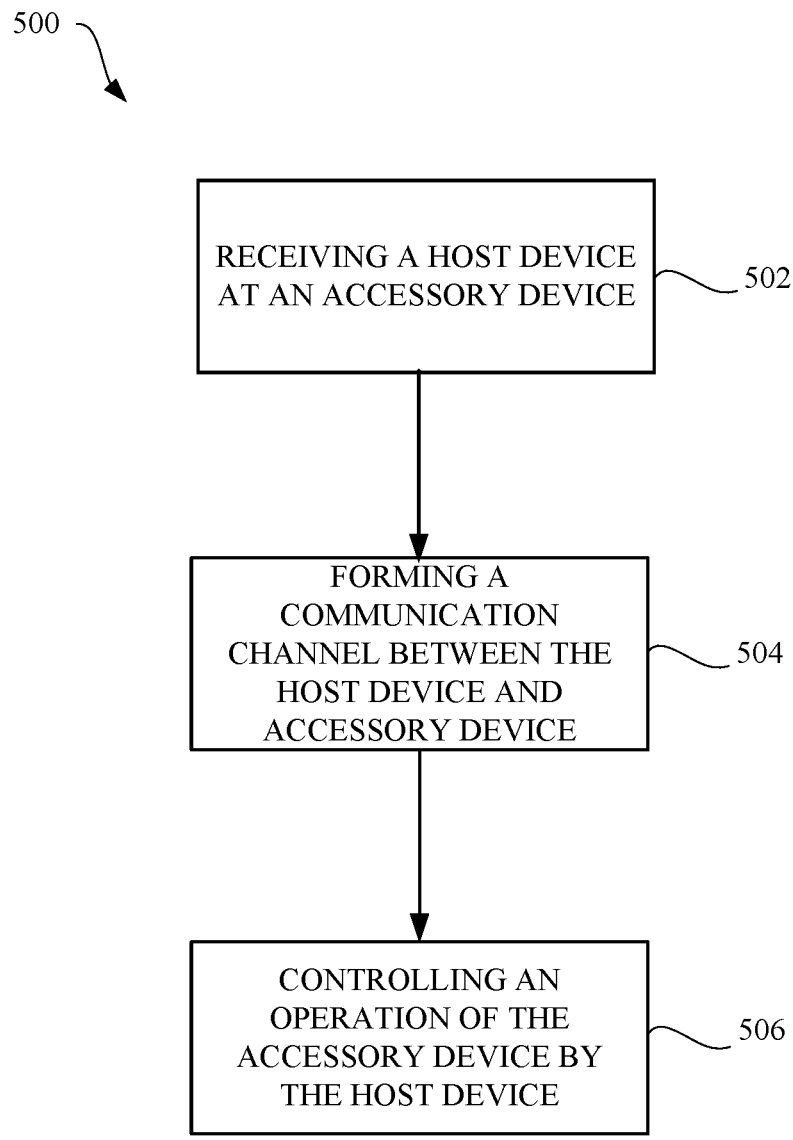
FIG. 5 shows a flowchart detailing a method of enhancing an electronic host device in accordance with the described embodiments.

FIG. 5 shows a flowchart detailing a method of enhancing an electronic host device in accordance with the described embodiments. Process 500 can be carried out at least in part by an operating component carried by the electronic host device, for example. Process 500 can start at 502 by receiving the electronic host device at an electronic accessory device. These devices can be any suitable host device and accessory device, such as those set forth in the above embodiments. In particular, it is contemplated that the electronic accessory device is inoperable without the electronic host device. The process continues at 504, which can involve forming a communication channel between the host device and the accessory device. The communication channel can be formed subsequent to the host device being captured by and secured within a docking port associated with the accessory device, such as at 502. In one embodiment, the communication channel can be formed by completion of a mating between electrical contacts at an interface between the host device and the accessory device. In one embodiment, the communication channel can be of a wireless nature. In yet another embodiment, the communication channel can be a mix of wired communication and wireless communication. In any case, once the communication channel has been established, the host device can utilize resources provided by the accessory device. This can take place at 506, which can involve controlling an operation of the accessory device by the host device using the communication channel. This can involve, for example, the host device controlling a display screen on the accessory device. Again, it is contemplated that the accessory device is inoperable until the communication channel is formed.

Figure 6:
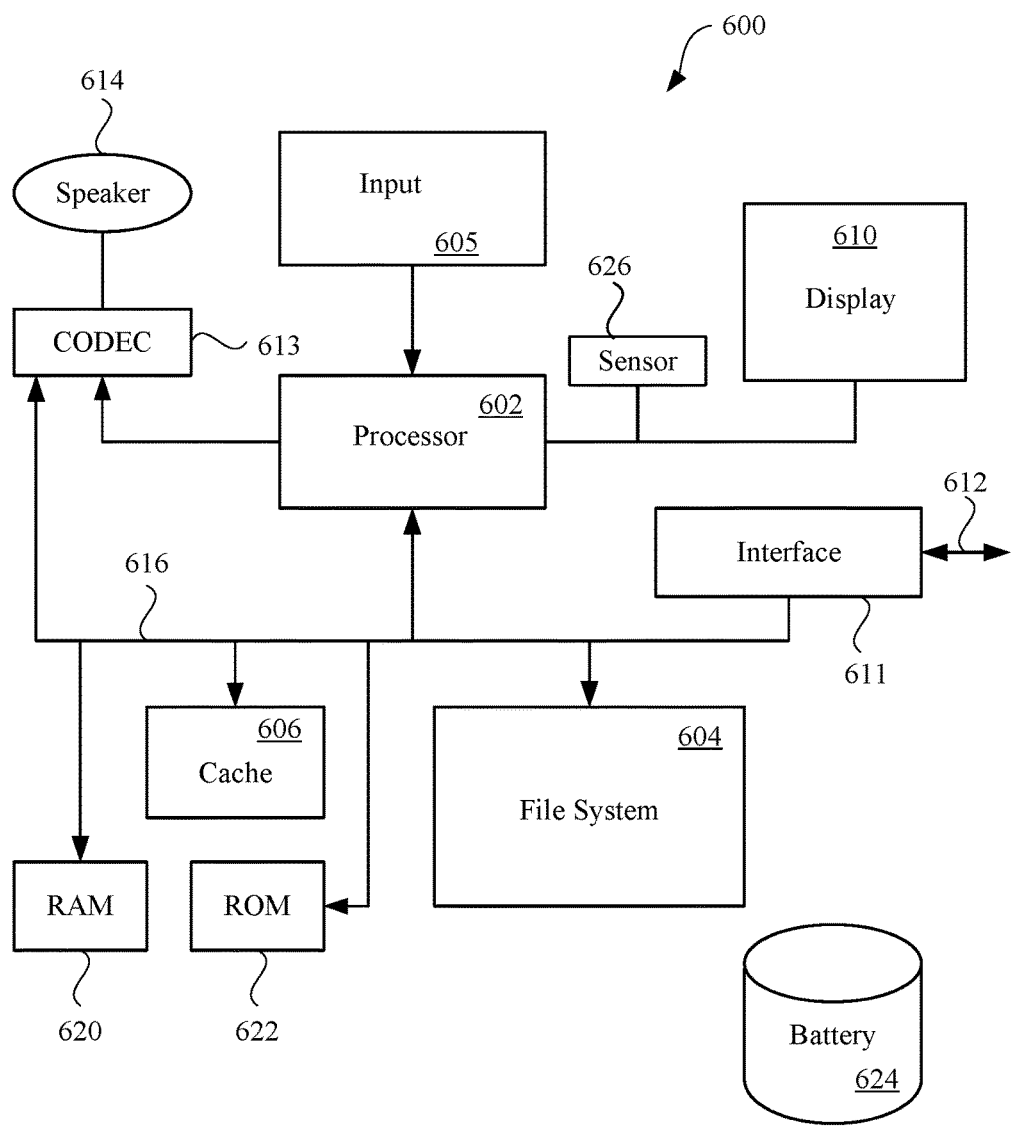
FIG. 6 is a block diagram of an electronic device suitable for use with the described embodiments.

FIG. 6 is a block diagram of an electronic device 600 suitable for use with the described embodiments. The electronic device 600 illustrates circuitry of a representative computing device. The electronic device 600 includes a processor 602 that pertains to a microprocessor or controller for controlling the overall operation of the electronic device 600. The electronic device 600 stores media data pertaining to media items in a file system 604 and a cache 606. The file system 604 is, typically, a semiconductor memory, cloud storage, or storage disks or hard drives. The file system 604 typically provides high capacity storage capability for the electronic device 600. However, since the access time to the file system 1004 is relatively slow, the electronic device 600 can also include a cache 606. The cache 606 is, for example, Random-Access Memory (RAM) provided by semiconductor memory. The relative access time to the cache 606 is substantially shorter than for the file system 604. However, the cache 606 does not have the large storage capacity of the file system 604. Further, the file system 604, when active, consumes more power than does the cache 606. The power consumption is often a concern when the electronic device 600 is a portable media device that is powered by a battery 624. The electronic device 600 can also include a RAM 620 and a Read-Only Memory (ROM) 622. The ROM 622 can store programs, utilities or processes to be executed in a non-volatile manner. The RAM 620 provides volatile data storage, such as for the cache 606.

The electronic device 600 also includes a user input device 608 that allows a user of the electronic device 600 to interact with the electronic device 600. For example, the user input device 608 can take a variety of forms, such as a button, keypad, dial, touch screen, audio input interface, visual/image capture input interface, input in the form of sensor data, etc. Still further, the electronic device 600 includes a display 610 (screen display) that can be controlled by the processor 602 to display information to the user. A data bus 616 can facilitate data transfer between at least the file system 604, the cache 606, the processor 602, and the CODEC 613.

In one embodiment, the electronic device 600 serves to store a plurality of media items (e.g., songs, podcasts, etc.) in the file system 604. When a user desires to have the electronic device play a particular media item, a list of available media items is displayed on the display 610. Then, using the user input device 608, a user can select one of the available media items. The processor 602, upon receiving a selection of a particular media item, supplies the media data (e.g., audio file) for the particular media item to a coder/decoder (CODEC) 613. The CODEC 613 then produces analog output signals for a speaker 614. The speaker 614 can be a speaker internal to the electronic device 600 or external to the electronic device 600. For example, headphones or earphones that connect to the electronic device 600 would be considered an external speaker.

The electronic device 600 also includes a network/bus interface 611 that couples to a data link 612. The data link 612 allows the electronic device 600 to couple to a host computer or to accessory devices. The data link 612 can be provided over a wired connection or a wireless connection. In the case of a wireless connection, the network/bus interface 611 can include a wireless transceiver. The media items (media assets) can pertain to one or more different types of media content. In one embodiment, the media items are audio tracks (e.g., songs, audio books, and podcasts). In another embodiment, the media items are images (e.g., photos). However, in other embodiments, the media items can be any combination of audio, graphical or visual content. Sensor 626 can take the form of circuitry for detecting any number of stimuli. For example, sensor 626 can include a Hall Effect sensor responsive to external magnetic field, an audio sensor, a light sensor such as a photometer, and so on.

Although the foregoing disclosure has been described in detail by way of illustration and example for purposes of clarity and understanding, it will be recognized that the above described disclosure may be embodied in numerous other specific variations and embodiments without departing from the spirit or essential characteristics of the disclosure. Certain changes and modifications may be practiced, and it is understood that the disclosure is not to be limited by the foregoing details, but rather is to be defined by the scope of the appended claims.

What is claimed is:

1. An accessory device for expanding functionality of a portable electronic device, the accessory device comprising:
   a housing having a display carried by a lid that is pivotally coupled to a base, the base having a recess capable of retaining the portable electronic device in at least two different orientations;
   an operational component capable of carrying out an operation in accordance with a function requested by the portable electronic device; and
   a control interface in communication with the operational component such that (i) when the portable electronic device is retained within the recess according to a first orientation, the control interface facilitates a communication channel between the operational component and the portable electronic device to allow the operational component to receive a request from the portable electronic device to perform a first function, and (ii) when the portable electronic device is retained within the recess according to a second orientation, the control interface facilitates a communication channel between the operational component and the portable electronic device to allow the operational component to perform a second function that is different than the first function.

2. The electronic accessory device as recited in claim 1, further comprising:
   a sensing unit in communication with the control interface, the sensing unit capable of determining whether the portable electronic device is retained within the recess in the first orientation or the second orientation.

3. The electronic accessory device as recited in claim 1, wherein the display is capable of presenting visual content that is based on the first orientation or the second orientation.

4. The electronic accessory device as recited in claim 3, wherein the operational component includes a sensing circuit that is capable of (i) detecting a gesture at the display, and (ii) providing an input signal to the portable electronic device based on the gesture so as to control one or more functions of the portable electronic device.

5. The electronic accessory device as recited in claim 1, wherein the first orientation is different than the second orientation.

6. The electronic accessory device as recited in claim 1, further comprising:
   an input device capable of (i) receiving user input, and (ii) providing a corresponding output signal to the display that is based on the user input, thereby causing the display to present visual content based on the user input.

7. The electronic accessory device as recited in claim 1, wherein the control interface is capable of reconfiguring the first and second functions based on the first and second orientations.

8. A method for enhancing functionality of a portable electronic device, the method comprising, at an electronic accessory device that includes a housing that carries an operational component and a control interface:
   receiving an indication, from the control interface, that the portable electronic device is retained within a recess of the housing;
   determining whether the portable electronic device is retained within the recess according to a first orientation or a second orientation;
   in response to determining that the portable electronic device is retained within the recess according to the first orientation:
      establishing a communication channel between the operational component and the portable electronic device,
      receiving a request from the portable electronic device based on the first orientation, and
      causing the operational component to perform a first function in accordance with the request.

9. The method as recited in claim 8, wherein, in response to determining that the portable electronic device is retained within the recess according to the second orientation, the method further comprises:
   causing the operational component to perform a second function in accordance with the second orientation, wherein the second function is different than the first function.

10. The method as recited in claim 9, wherein the housing further carries a display, and the display is capable of presenting visual content that is based on the first orientation or the second orientation.

11. The method as recited in claim 8, wherein the electronic accessory device is inoperable until the communication channel is established between the operational component and the portable electronic device.

12. The method as recited in claim 8, further comprising:
   reconfiguring the first and second functions based on the first and second orientations.

13. The method as recited in claim 8, wherein the housing further carries a sensing circuit and a display, and the method further comprises:
   detecting a gesture at the display, and
   providing an input signal to the portable electronic device that is based on the gesture so as to control one or more functions of the portable electronic device.

14. An electronic accessory device for enhancing functionality of a portable electronic device, comprising:
   a housing having a display carried by a lid that is pivotally coupled to a base, the base having a recess capable of retaining the portable electronic device in at least two different orientations;
   a sensing unit capable of determining whether the portable electronic device is retained within the recess in a first orientation or a second orientation;
   an operational component capable of carrying out an operation in accordance with a function requested by the portable electronic device;
   a control interface in communication with the operational component and the sensing unit such that when the portable electronic device is retained within the recess according to the first orientation, the control interface facilitates a communication channel between the operational component and the portable electronic device that allows the portable electronic device to request that the operational component performs a first function based on the first orientation; and
   an output device capable of presenting a user output based on the first function.

15. The electronic accessory device as recited in claim 14, wherein, when the portable electronic device is retained within the recess according to the second orientation, the control interface allows the portable electronic device to request that the operational component performs a second function that is based on the second orientation, and the second function is different than the first function.

16. The electronic accessory device as recited in claim 14, wherein, when the portable electronic device is retained within the recess, an exterior surface of the portable electronic device is flush with an exterior surface of the base.

17. The electronic accessory device as recited in claim 14, wherein the output device is at least one of a display or a speaker.

18. The electronic accessory device as recited in claim 14, further comprising:
   an input device capable of (i) receiving user input, and (ii) providing a corresponding output signal to the display that is based on the user input, thereby causing the display to present visual content based on the user input.

19. The electronic accessory device as recited in claim 14, further comprising:
   a sensing circuit that is capable of (i) detecting a gesture at the display, and (ii) providing an input signal to the portable electronic device based on the gesture, thereby controlling one or more functions of the portable electronic device.

20. The electronic accessory device as recited in claim 14, wherein the display is capable of presenting visual content in accordance with a corresponding signal provided by the portable electronic device.

* * * * *